| United States Patent [19] | [11] | 4,190,634 |
|---|---|---|
| Feiler | [45] | Feb. 26, 1980 |

[54] PURIFYING PHOSPHORIC ACID BY EXTRACTION WITH AN ALIPHATIC NITRILE

[75] Inventor: William A. Feiler, Kirkwood, Mo.

[73] Assignee: Monsanto Company, St. Louis, Mo.

[21] Appl. No.: 904,066

[22] Filed: May 8, 1978

[51] Int. Cl.$^2$ ............................................. C01B 25/22
[52] U.S. Cl. ................................................. 423/321 S
[58] Field of Search ........................ 423/321 R, 321 S

[56] References Cited

U.S. PATENT DOCUMENTS

| 3,497,330 | 2/1970 | Baniel et al. ...................... 423/321 S |
| 3,649,220 | 3/1972 | Powell et al. ...................... 423/321 S |
| 3,700,415 | 10/1972 | Koerner, Jr. et al. ........... 423/321 S |
| 3,707,357 | 12/1972 | Chiang ................................ 423/321 S |
| 3,784,678 | 1/1974 | Beltz et al. ......................... 423/321 S |
| 3,966,873 | 6/1976 | Elikan et al. ...................... 423/321 S |

*Primary Examiner*—O. R. Vertiz
*Assistant Examiner*—Thomas W. Roy
*Attorney, Agent, or Firm*—S. M. Tarter; E. P. Grattan; F. D. Shearin

[57] ABSTRACT

Impure "wet process" phosphoric acid is purified by solvent extraction in an improved process which uses a solvent composition which comprises an aliphatic nitrile.

7 Claims, No Drawings

PURIFYING PHOSPHORIC ACID BY EXTRACTION WITH AN ALIPHATIC NITRILE

BACKGROUND OF THE INVENTION

This invention relates to purification of phosphoric acid by solvent extraction. More particularly, the invention relates to a method of removing impurities from relatively impure aqueous phosphoric acid solutions by extraction with a substantially water-insoluble solvent.

Aqueous solutions of phosphoric acid have been produced by acidulation of phosphate rock with, for example, sulfuric acid, and recovery of the resultant phosphoric acid together with a variety of impurities. Such solutions, called "wet process acids" have been used in the production of fertilizers.

A number of methods have been suggested for removing at least a portion of the impurities from wet-process acid so as to produce a technical grade acid suitable for a variety of industrial uses, such as pickling of steel, for example. Among these suggested methods, extraction of phosphoric acid using a variety of solvents has been proposed.

U.S. Pat. No. 3,361,527 teaches the use of relatively water-insoluble secondary or tertiary hydrocarbyl amines for extracting phosphate values from wet-process acid. The amines are usually diluted with one or more of a variety of hydrocarbon solvents, or chlorinated hydrocarbon solvents. Optionally, small amounts of aliphatic alcohols can be included to improve the solubility of the amines in the solvents. The use of an amine extractant alone, however, makes recovery of phosphate values in the acid form quite difficult. Usually, an alkaline stripping solution is used, giving a phosphate salt of an alkali metal, sodium phosphate, for example.

U.S. Pat. No. 3,318,661 teaches the extraction of phosphoric acid using as a solvent a dialkyl ether in which each alkyl group contains 2–5 carbon atoms. With an ether solvent alone, however, overall yields of phosphoric acid are low, in the area of 55%, with the remainder reporting to a raffinate stream containing most of the impurities originally present. The ether system also relies on a temperature differential between the extraction step and the acid release step, necessitating refrigeration for optional extraction.

U.S. Pat. No. 3,903,247 shows a mixture of a dialkyl ether with a minor proportion of an aliphatic alcohol of 3–8 carbon atoms. This combination shows an improved split and overall yield of phosphoric acid, but is relatively ineffective in removing anionic impurities such as sulfates from the wet-process acid.

Other references teach the use of still different combinations in purifying phosphoric acid by extraction. U.S. Pat. No. 3,298,782 shows the use of a combination of a major portion of an alcohol with a minor portion of an amine for this purpose. This combination of solvents has not been particularly effective in reducing the level of iron in the product acid, however. The combination of alcohol and amine also appears to be more effective at low ($\sim 30\% P_2O_5$) acid concentrations than at the higher concentrations found in concentrated wet-process acid ($\sim 60\% P_2O_5$).

U.S. Pat. No. 3,972,982 teaches the use of the combination of an amine with a silane compound in extraction-purification of impure phosphoric acid. This latter solvent combination is recommended especially to remove fluorides from the wet-process acid.

In all the above processes, the solvent systems are effective in extracting substantial portions of the phosphoric acid out of the impure wet-process acid. On back-extraction with water, aqueous phosphoric acid of increased purity is obtained. However, in all of these known systems substantial amounts of metal ions are also extracted from the wet-process acid, and show up in the purified acid. A need exists, therefore, for an extraction system which would be more selective to phosphoric acid; that is, one which would remove less of the metallic ion impurities from the wet-process acid and thereby produce a purer aqueous phosphoric acid product.

SUMMARY OF THE INVENTION

It is the object of this invention to provide an improved method of purifying phosphoric acid by solvent extraction. It is a further object of this invention to provide a method whereby, in the solvent extraction of purified $H_3PO_4$ from impure aqueous wet-process phosphoric acid, a substantially smaller proportion of the metal contaminants are co-extracted. It is yet another object of this invention to provide an improved extraction process whereby, by using a particular solvent, technical grade acid of increased purity can be prepared. These and other objects are attained by the invention as is set forth below.

In accordance with this invention, an improved process of removing at least a portion of the contaminants from impure aqueous phosphoric acid solutions containing at least 30% by weight of phosphoric acid is provided. In the steps of first contacting such impure acid solutions with a solvent to extract a portion of the phosphoric acid, then separating the solvent and finally stripping the phosphoric acid from the solvent with water, improvement is realized by employing a solvent comprising at least one aliphatic nitrile having 4–10 carbon atoms. Optionally, minor amounts of other solvents can be included with the nitrile solvent, such as ethers, alcohols, ketones and secondary or tertiary amines, all of which are essentially insoluble in water.

DESCRIPTION OF PREFERRED EMBODIMENTS

The process of this invention can be effectively employed to remove impurities, both cationic and anionic, from any impure aqueous phosphoric acid solution. However, the process is most desirably employed to treat wet-process phosphoric acid, which is the product of acidulation of phosphate rock. The analysis of such an aqueous phosphoric acid will necessarily depend on the type of acid employed to treat the rock, as well as the particular nature of the rock itself. Sulfuric acid is widely used in the acidulation step, although other strong acids, such as hydrochloric can be employed. The method of the invention is capable of application in the purification of a wide variety of wet-process acids produced from phosphate rock of various geographic origin, and by various acidulation techniques. In general, such impurities as compounds of silicon, calcium, arsenic, iron, fluorine, aluminum, chromium, vanadium and lead are present in the wet-process acid. If sulfuric acid is the acidulation means, sulfate ions will also be present. Although the upper limit of the phosphoric acid content of the impure acid is not critical to the operation, poor process efficiency and very dilute product acid result when operating below about 30% H$_3$PO$_4$ concentration of feed acid, thus the H$_3$PO$_4$ content of the impure acid feed should normally be maximized.

As noted, the varied sources of phosphate rock and the many different processing methods used in producing wet-process acid yield a great many different qualities of wet-process acid. In purifying wet-process acid, the type and amount of various impurities and the concentration of the phosphoric acid all help to determine the techniques which must be used. It is characteristic of most of the known extraction methods that cationic impurities are more readily removed than anionic impurities. Thus, it is sometimes preferable to pretreat the wet-process acid before extraction so as to remove some of the anionic impurities. For example, since sulfates are difficultly removed in the extraction process, excess sulfate ions can be precipitated out of the wet-process acid with calcium oxide or ordinary lime.

While the process of the invention can be effectively used to improve the purity of practically any type of aqueous phosphoric acid solution, certain properties of the feed acid are preferred in order to produce a technical grade phosphoric acid most economically. Among these are a high P$_2$O$_5$ content and a low sulfate content (although a low sulfate content may be a quality requirement). It is advantageous that the P$_2$O$_5$ content be as high as possible in the impure acid, since this property aids in the overall yield figures and minimizes loss of product into the raffinate stream.

A minimum amount of organic materials in the feed acid is also desirable for wet-process acid, and this result is best achieved by calcining the phosphate rock before acidulation. Similarly, a minimum amount of suspended solids is preferred in the feed acid. Typical wet-process acid can contain one to three precent or more of suspended solids, and can be adequately processed. Higher amounts, in excess of about five percent, are expected to show up in the raffinate stream, and can cause it to become excessively viscous.

The aliphatic nitriles which are useful in the process of the invention are those which have from 4 to 10 carbon atoms. Below four carbon atoms the nitriles become increasingly water-soluble, and above about ten carbon atoms, the P$_2$O$_5$ is not sufficiently soluble in the nitriles. Both straight chain and branched chain nitriles can be used.

Among specific nitriles which can be used are: n-butyronitrile; isobutyronitrile; n-valerylnitrile; isovalerylnitrile; 2,4-dimethylpentanoylnitrile; n-hexanoylnitrile; n-heptanoylnitrile; 2-ethyloctanoylnitrile, and the like.

Because of their great tendency to hydrolyze, isonitriles (componds of the general formula RNC) are not effective in the process of the invention.

Mixtures of one or more nitriles can be used in the process of the invention, or one or more of the following solvents can be used in minor proportion along with one or more nitriles: aliphatic alcohols and ketones having 4–10 carbon atoms, dialkyl ethers having from 2 to 5 carbon atoms in each alkyl group, and secondary or tertiary amines having molecular weights between about 200 and about 700.

Water is used in stripping (or back-extracting) the phosphoric acid from the solvent to produce an aqueous acid product. In order to avoid introducing additional impurities at this stage, condensate or de-ionized water is preferably used for this purpose.

Temperatures at which the process can be performed are generally from about 0° C. up to about 100° C. Operation at room temperature (25° C.) is effective.

The process of the invention can be operated effectively continuously or as a batch process. Normally, continuous operation lends itself to greater efficiency and more accurate control of product quality. In the extraction and stripping steps, countercurrent flow is preferred as improving the efficiency of these steps.

The process of the invention can be conveniently operated at ambient pressures, although higher or lower pressures can be employed, if desired.

The type and size of the equipment used in the process of the invention forms no part of the invention itself, and can consist of any of the known equipment in the liquid-liquid extraction art.

The essential steps of the process of the invention are, in sequence, extraction of phosphoric acid from an impure aqueous feed into a solvent, and stripping the phosphoric acid from the solvent with water. While other operations may also be performed as desired, their use is not essential to the process. Such additional operations include concentration, filtration, back-washing, solvent recovery and purification, and acid defluorination. Waste disposal is also a possible concurrent operation which, however, is not essential to the process.

The extraction step essentially requires contacting the impure aqueous acid feed with the solvent so as to effect a transfer of at least a portion of the phosphoric acid from the aqueous feed into the solvent phase. Any of a variety of known techniques can be used in order to obtain an intimate contact of the two phases with each other. After the contact is made and the transfer of phosphoric acid is effected, the two phases are then separated, again using any convenient known technique. Normally, the extraction step will be performed in a succession of stages so that the amount of phosphoric acid extracted and its concentration are maximized, approaching the equilibrium state between the phases. Separation of the phases will follow each stage of intimate mixing, with the goal being to avoid entraining any of one phase in the other. From one stage up to as many as six or more can be employed, the number being dictated by the operating parameters of the acid-solvent system chosen, and by the economics of operating costs and capital cost of equipment.

The stripping step is essentially the reverse of the extracting step, in that it consists of contacting the solvent phase (containing phosphoric acid) with water to effect transfer of at least a portion of the phosphoric acid from the solvent phase into an aqueous phase; namely the product acid. As with the extraction step, any known techniques can be used. Separation of the two phases again is accomplished by any convenient means. Again, multiple stages can be employed in order to make the stripping operation more efficient and to maximize the product acid strength, the number of stages being decided by the operating parameters and economic factors.

Depending on the product requirements, concentration steps can be used, optionally, at various points in the process. The impure acid feed can be pre-concentrated above the 30% minimum in order to improve the process efficiency, or the product acid can be concentrated, if desired, or both materials can be concentrated. Since concentration entails added expense, economics can dictate either for or against its use.

Although the process is operable without it, a reflux or "backwash" step may also be performed. Such a step can be effective in removing certain impurities to a greater degree, and resulting in higher product quality. The backwash step, if used, should take place after the extraction step and before the stripping step. Briefly, it consists of washing the solvent phase (after it has extracted as much phosphoric acid as possible from the feed acid) with a relatively pure aqueous solution of phosphoric acid. In this way, impurities are back-extracted from the solvent phase into the aqueous phase.

When applied to continuous, countercurrent operation, a portion of the final product acid is diverted as a backwash stream, and is fed through a backwash area countercurrent to the solvent flow.

Any of a number of additional steps can be employed to remove portions of the impurities remaining in the aqueous acid which leaves the stripping area. These steps are not essential to the process of the invention, but can be performed if higher product quality is required and if their additional cost is justified. For example, the aqueous acid can have traces of entained solvent removed from it by settling and/or distillation. The purified, aqueous acid can also be steam treated to remove at least a portion of the hydrofluoric acid contained therein. As previously mentioned, the purified acid can also be heat-concentrated to remove a portion of the water and thereby raise the $H_3PO_4$ content of the acid.

The raffinate stream will contain a major portion of the impurities which enter in the impure acid feed. Unavoidably, the raffinate will also contain a minor portion of the phosphoric acid originally charged. If desired, some fraction of the phosphoric acid values can be recovered from the raffinate by any of a variety of known methods.

Residual solvent entrained in the raffinate can be removed by steam-stripping, with the recovered solvent recycled to the extraction area.

The process of the invention produces an aqueous solution of phosphoric acid which can be used for a variety of purposes, such as for pickling of steel, or for the production of alkali-metal phosphate salts, useful in detergent formulations.

The various features of the present invention are illustrated by the following examples which are not to be construed as limitative, since various changes and modifications can be made in the light of the guiding principles and teachings disclosed. All parts and percentages are by weight unless otherwise indicated.

EXAMPLE I

As a preliminary screening test, various mixtures of n-butyronitrile with a relatively pure phosphoric acid were prepared. The percent concentration of the acid by weight was approximately equal to the amount of aqueous acid used in each case. The mixtures were shaken in a separatory funnel, and the resulting phases were analyzed for concentration of $H_3PO_4$ and water. In most instances, two easily separable phases resulted; however, in some instances, a homogeneous single phase resulted.

The following results were observed, as shown in Table I.

TABLE I

| | Mixture | | Phase Analyses | | | |
| | | | Upper Phase Conc., % | | Lower Phase Conc., % | |
| Run No. | Solvent (gm) | AqH$_3$PO$_4$(gm) (approx. conc.) | H$_3$PO$_4$ | H$_2$O | H$_3$PO$_4$ | H$_2$O |
|---|---|---|---|---|---|---|
| 1 | 25 | 40 | ≦0.1 | 1.9 | 41.7 | 56.2 |
| 2 | 25 | 50 | 0.1 | 1.6 | 49.6 | 48.1 |
| 3 | 25 | 65 | 4.0 | 2.0 | 62.3 | 32.9 |
| 4 | 25 | 71 | (Homogeneous) | | | |
| 5 | 25 | 78 | (Homogeneous) | | | |
| 6 | 40 | 71 | 35.0 | 12.2 | 60.9 | 27.7 |
| 7 | 40 | 78 | (Homogeneous) | | | |
| 8 | 50 | 78 (+H$_2$O) | 36.6 | 13.2 | 60.7 | 26.8 |

Analysis of the results in Table I shows that as the amount of aqueous acid increases relative to the amount of solvent (n-butyronitrile, in this instance) an increasing concentration of $H_3PO_4$ is found in the upper solvent phase.

EXAMPLE II

The procedure of Example I was repeated, except that isobutyronitrile was substituted for n-butyronitrile. Similar results were found as summarized in Table II, following.

TABLE II

| | Mixture | | Phase Analyses | | | |
| | | | Upper Phase Conc., % | | Lower Phase Conc., % | |
| Run No. | Solvent (gm) | AqH$_3$PO$_4$(gm) (approx. conc.) | H$_3$PO$_4$ | H$_2$O | H$_3$PO$_4$ | H$_2$O |
|---|---|---|---|---|---|---|
| 9 | 25 | 40 | ≦0.1 | 1.9 | 41.5 | 53.7 |
| 10 | 25 | 50 | 0.15 | 1.7 | 48.6 | 49.1 |
| 11 | 25 | 65 | 3.9 | 1.9 | 60.0 | 32.4 |
| 12 | 25 | 71 | (Homogeneous) | | | |
| 13 | 25/78 | (Homogeneous) | | | | |
| 14 | 40 | 71 | 34.3 | 11.9 | 59.3 | 27.2 |
| 15 | 40 | 78 | (Homogeneous) | | | |
| 16 | 50 | 78(+H$_2$O) | 37.2 | 13.0 | 60.5 | 26.8 |

Analysis of the results in Table II shows that the results with isobutyronitrile are quite similar to those with n-butyronitrile.

Both Example I and II show that the nitrile solvents tested are capable of extracting significant quantities of $H_3PO_4$ out of the aqueous phase into the solvent phase.

EXAMPLE III

In the purification of wet-process phosphoric acid, iron is a primary impurity. Since levels of iron are easily measured, the efficiency of a purification process can be gauged by the amount of iron present in the purified acid.

To evaluate the nitriles for iron-removal, 1:1 weight-ratio mixtures were made of a wet-process acid and n-butyronitrile and isobutyronitrile, respectively. The wet-process acid contained 53% $P_2O_5$, 1.4% $SO_4$, 0.8% iron, and 1.2% aluminum.

After standing three days at room temperature, the solvent phase of each of the mixtures was analyzed as follows:

| Solvent Type | Fe | H$_3$PO$_4$ |
|---|---|---|
| n-butyronitrile | 226 ppm | 32.7% |
| isobutyronitrile | 92 ppm | 33.7% |

This low iron content is superior to that found using isopropyl ether, a known solvent for extraction-purification of impure H₃PO₄.

EXAMPLE IV

Repeating the process of Example I, but substituting n-hexanoylnitrile and n-heptanoyl nitriles gave similar results as Example I, but with the anticipated lower solubility of $H_3PO_4$ in both solvents. Using the wet-process acid of Example III gave the following solvent phase analyses:

| Solvent Type | Fe | $H_3PO_4$ |
| --- | --- | --- |
| hexanoylnitrile | 126 ppm | 26.7% |
| heptanoylnitrile | 138 ppm | 17.7% |

Although the six and seven carbon nitriles contained lower acid concentrations than found with four-carbon nitriles, the iron levels are still quite low.

EXAMPLE V

Using the aliphatic nitriles disclosed above, extraction-purification of wet-process phosphoric acid is performed. A first extraction area, in multiple stages, countercurrently contacts impure acid with solvent, so that a portion of the phosphoric acid is extracted into the solvent.

The solvent, containing phosphoric acid, is then contacted in the multiple stages of the backwash area with water so that the phosphoric acid is back-extracted into the aqueous phase, forming an aqueous phosphoric acid of higher purity.

The foregoing examples and methods have been described in the specification for the purpose of illustration and not limitation. Many other modifications and ramifications will naturally suggest themselves to those skilled in the art based on this disclosure.

Having thus described the invention, what is desired to be claimed and secured by Letters Patent is:

1. In the process for removing at least a portion of the impurities from impure aqueous phosphoric acid solutions containing at least 30% by weight of phosphoric acid by the successive steps of:
   contacting the impure acid with a substantially water-insoluble solvent whereby a portion of the phosphoric acid is extracted into the solvent, forming a loaded solvent phase;
   separating the solvent phase from the remaining materials;
   contacting the solvent phase with water whereby a portion of the phosphoric acid is extracted into the water, forming an aqueous phosphoric acid solution of increased purity;
   and separating the aqueous acid thus formed from the remaining materials;
   wherein the improvement comprises contacting the impure acid with at least one aliphatic nitrile of from 4 to 10 carbon atoms in an amount effective to extract a portion of the phosphoric acid to form a loaded solvent phase with a smaller proportion of iron than the impure aqueous phosphoric acid solution.

2. The process of claim 1, wherein the aliphatic nitrile contains a minor proportion by weight of a water-insoluble ketone, alcohol, ether or amine.

3. The process of claim 1, wherein the impure aqueous phosphoric acid solution is the product of the acidulation of phosphate rock.

4. The process of claim 1, with the additional step of washing the loaded solvent phase with a relatively pure aqueous solution of phosphoric acid before contacting it with water.

5. The process of claim 4, wherein the relatively pure aqueous solution of phosphoric acid is at a higher concentration of phosphoric acid than the aqueous acid finally formed.

6. The process of claim 1, wherein the steps are performed continuously.

7. The process of claim 1, wherein the aliphatic nitrile is butyronitrile or iso-butyronitrile.

* * * * *